US006499358B1

(12) United States Patent
Hogan et al.

(10) Patent No.: US 6,499,358 B1
(45) Date of Patent: Dec. 31, 2002

(54) APPARATUS FOR APPLYING A CONTROLLED AMOUNT OF TORQUE

(75) Inventors: Michael P. Hogan; Thomas G. Neal; Jason P. Small, all of Boulder; Arlan J. Reschke, Longmont; Terrance M. Duffin, Westminster; Arthur L. Schoenman, Longmont, all of CO (US)

(73) Assignee: Sherwood Services AG, Schaffhausen (CH)

( * ) Notice: Subject to any disclaimer, the term of this patent is extended or adjusted under 35 U.S.C. 154(b) by 0 days.

(21) Appl. No.: 09/472,776

(22) Filed: Dec. 27, 1999

(51) Int. Cl.[7] ........................ G01F 1/66
(52) U.S. Cl. ........................ 73/862.21
(58) Field of Search ........ 73/862.21, 862.333–862.336; 81/467, 461, 58, 60

(56) References Cited

U.S. PATENT DOCUMENTS

| | | | | | |
|---|---|---|---|---|---|
| 2,461,447 | A | | 2/1949 | Siesel | |
| 3,709,087 | A | | 1/1973 | Stone, Jr. | |
| 3,960,039 | A | | 6/1976 | Nash et al. | |
| 4,249,435 | A | | 2/1981 | Villenouve et al. | |
| 4,327,610 | A | | 5/1982 | Chiarenza | |
| 4,403,530 | A | | 9/1983 | Biddle | |
| 4,459,882 | A | | 7/1984 | Hayashi | |
| 4,589,289 | A | | 5/1986 | Neuhaus | |
| 4,644,830 | A | * | 2/1987 | Bailey et al. | 81/58.2 |
| 4,913,009 | A | * | 4/1990 | Andersen-Vie | 81/58.5 |
| 4,926,720 | A | | 5/1990 | Srzanna | |
| 5,059,210 | A | | 10/1991 | Clark et al. | |
| 5,224,403 | A | * | 7/1993 | Rueb | 81/477 |
| 5,366,412 | A | | 11/1994 | Beaty et al. | |
| 5,368,480 | A | | 11/1994 | Balfour et al. | |
| 5,433,665 | A | | 7/1995 | Beaty et al. | |
| 5,454,283 | A | * | 10/1995 | Stefano | 81/58.2 |
| 5,507,119 | A | | 4/1996 | Sumiya et al. | |
| 5,571,014 | A | | 11/1996 | Gregory, Jr. et al. | |
| 5,734,113 | A | | 3/1998 | Vogt et al. | |
| 5,810,859 | A | | 9/1998 | DiMatteo et al. | |
| 5,859,371 | A | | 1/1999 | Hsieh | |
| 5,911,801 | A | | 6/1999 | Fravalo et al. | |
| 5,996,453 | A | * | 12/1999 | Blacklock | 81/467 |

FOREIGN PATENT DOCUMENTS

| | | |
|---|---|---|
| DE | 23 50 579 | 10/1975 |
| DE | 90 03 771 | 6/1990 |

* cited by examiner

*Primary Examiner*—Benjamin R. Fuller
*Assistant Examiner*—Jewel V. Thompson

(57) ABSTRACT

A torque apparatus for the installation and removal of threaded connecting device that employs a plurality of leaf spring elements engaging a plurality of asymmetrical drive teeth sides to establish preset torque values in a hermetically sealed configuration or a variable range of preset torque values in a second configuration. The preset torque values can be readily changed in the second configuration by employing different quantities of leaf springs, differing leaf spring designs, or varying the geometry of the rotor drive teeth. The leaf spring to rotor drive teeth interface provides a slip mechanism to prevent over-torquing when torque values for the installation of a threaded connecting type device is exceeded. While both torque wrench configurations are sterilizable, the torque wrench that is capable of full disassembly for sterilization and use thereafter in a sterilized environment, is reconfigurable for different torque applications without calibration. The wrench can be primarily constructed as disposable device.

36 Claims, 8 Drawing Sheets

APPARATUS FOR APPLYING A CONTROLLED AMOUNT OF TORQUE

BACKGROUND

1. Technical Field

The resent disclosure relates to controlling the amount of torque applied to a threaded connection. More particularly, the present disclosure relates to an apparatus for applying a controlled amount of torque to either install or remove a threaded connection working member.

2. Description of Related Art

Torque wrenches are well known devices which most commonly use one or more elastic bending rods as in U.S. Pat. No. 5,734,113 to Vogt et al. ("Vogt et al.") or an axial spring device as in U.S. Pat. No. 5,859,371 to Hsieh ("Hsieh") and U.S. Pat. No. 5,911,801 to Fravalo et al. ("Fravalo et al.") as the primary source of their torque sensing mechanism. These torque wrenches use complex mechanisms that frequently employ one or more helical springs, roller bearings, an rod devices enclosed within their handle cavity. For example, Fravalo teaches a wrench head that pivots inside a hollow cavity and interfaces with a plunger rod type device that employs at least one rolling body to minimize friction. This mechanism then interfaces with an axially coiled spring. These internal mechanisms are too complex to support disassembly for ease of sterilization and are too expensive to use as a disposable torque wrench device.

Some patents directly address some degree of dismantling or removing and replacing internal components such as U.S. Pat. No. 4,249,435 to Villeneuve et al. ("Villeneuve et al.") and U.S. Pat. No. 5,734,113 to Vogt et al. ("Vogt et al."). These torque devices are also internally complex and cannot be cost effectively dismantled, sterilized, and then reassembled for use in sterile environment.

Another aspect of torque wrench technology involves a mechanism to preclude over torquing through a slip mechanism within the torque wrench. One torque wrench that has a leaf spring slip mechanism is U.S. Pat. No. 5,224,403 to Rueb ("Rueb"). Rueb teaches two basic embodiments of cantilevered beam leaf spring type torque wrench mechanisms that slip when the torque limit is exceeded.

In the first embodiment, the leaf spring acts as a cantilever beam that extends from the handle to perpendicularly engage a single symmetrical vertical gear tooth in the wrench head. Torque values are adjusted on the handle by varying the effective length of the cantilevered beam. In a similar second embodiment, Rueb discloses two perpendicular springs located within the wrench head that engage gear teeth a with complex double tooth shape. The perpendicular springs that engage the complex double tooth gears are held in place by two retaining shoulders of different height that create a shorter stiffer beam with greater resistive force in the counterclockwise direction than in the clockwise direction. Each complex double tooth of the gear has a single tooth side, where only the long tooth is engaged, and a double tooth side, where first the short and then the long tooth is engaged. The single tooth and double tooth sides are symmetrically sloped. Maximum clockwise torque is achieved as the longer tooth is engaged on the single tooth side of the complex double tooth gear by the perpendicular leaf spring and the perpendicular leaf spring is forced past the resisting counter force of the spring retaining shoulder. The lower clockwise supporting spring retaining shoulder creates a cantilever beam with a longer, less resistive counter force.

This second embodiment removes a threaded member in the counterclockwise direction without adjustments using a combination of the double tooth form and the shock force imparted by the spring as it forced past the first shorter tooth and then impacts upon the second longer tooth. In addition, the longer counterclockwise retaining shoulder support provides a shorter cantilevered spring that provides greater resistive force than in the clockwise direction.

The second embodiment of Reub is distinctly limited by its lack of ability to adjust for different torque values and its internal complexity which precludes it from being disassembled, sterilized, and reassembled for use in a sterile environment. As a result, this and other current torque wrench designs require the surgical instrument to be removed from the sterile environment, their working member removed and replaced with the proper torque, and then the surgical instrument must be resterilized. Torque wrenches that have mechanisms such as those above and are used in medical applications are typically not used in a sterile environment.

Accordingly, there is a need for improved apparatus for applying a controlled amount of torque that can be sterilized using readily available sterilization equipment. It is desirable that the apparatus be simple in construction, easy to disassemble and reassemble, and that it does not require calibration upon reassembly. It is desirable to provide a torquing apparatus that is so inexpensive that it can be disposable. It is further desirable that the torquing apparatus have the potential to apply different torques for different threaded member applications and require no adjustments for the installation or removal of a specific threaded connection.

SUMMARY

A torque apparatus is provided that employs a plurality of leaf spring elements engaging a plurality of asymmetrical drive teeth sides to establish a range of preset torque values for the installation and removal of threaded connecting devices. The preset torque values can be readily changed by employing different quantities of leaf springs, differing leaf spring designs, or varying the geometry of the rotor drive teeth. The leaf spring to rotor drive teeth interface provides a slip mechanism to prevent over-torquing when torque values for either the installation or removal of a threaded connecting type device are exceeded. The wrench head may be hermetically sealed in its preferred configuration, or in an alternative configuration capable of full disassembly. Both configurations can be readily sterilized using an autoclave or similar sterilization methods. The second configuration adds the advantage that the apparatus can be reconfigured for different torque applications without calibration within a sterilized environment. The wrench can also be employed as a disposable device.

The invention, together with attendant advantages, will be best understood through by the reference to the following detailed description of the invention when used in conjunction with the figures below.

DETAILED DESCRIPTION

Figure 1:
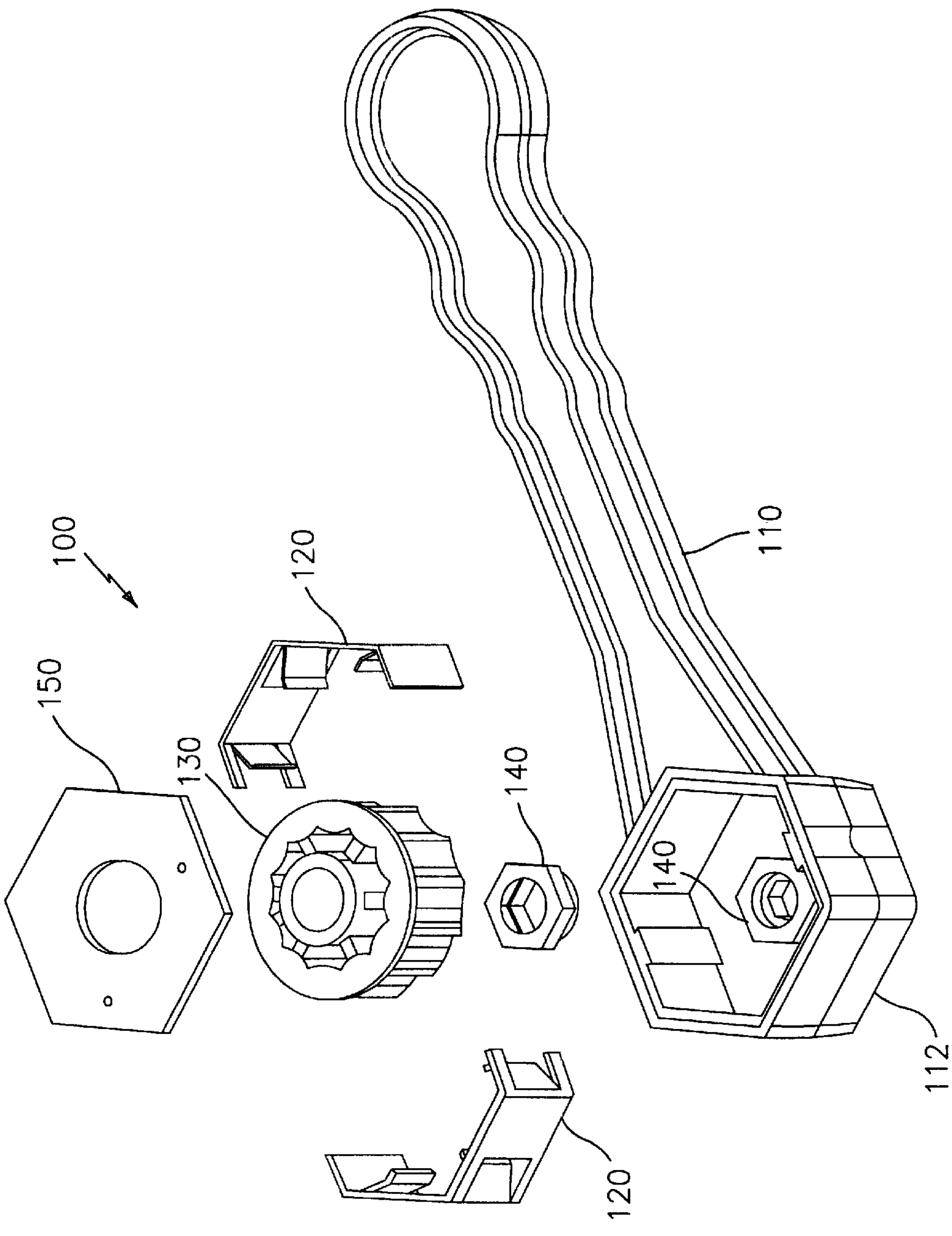
FIG. 1 is an enlarged exploded perspective view of one configuration of the torque apparatus.

Referring to the drawings in detail, and initially to FIG. 1, torque wrench 100 includes a handle 110, a head 112, at least one leaf spring 120, at least one rotor 130, a plurality of hex inserts 140, and a cap 150. When cap 150 is in position, it holds rotor 130 and hex insert 140 in place within head 112. Cap 150 can be fixedly connected to head 112 using ultrasonic welding, or similar techniques, to form a hermitic seal, removably attached, or be an integral part of head 112. Thus, torque wrench 100 is configured to be easily sterilized as a hermitically sealed assembly or disassembled and sterilized using widely available sterilization techniques. Torque wrench 100 is configurable as either a disposable or reusable instrument.

Figure 2A:
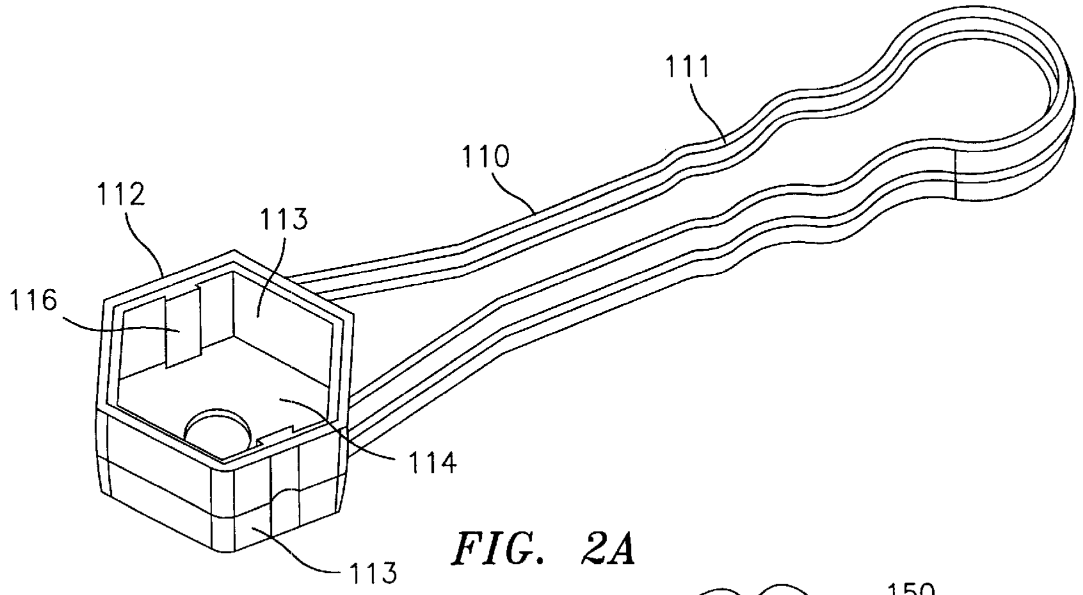
FIG. 2A is a perspective view of the handle and head of the torque apparatus.

Referring now to FIG. 2A, torque wrench 100 has a handle 110 on a first end, and a head 112 on an opposing second end. Handle 110 contains a grip enhancing means 111 that includes ergonomic enhancements such as knurling, scalloping, or undulations that aid gripping. Head 112 has side walls 113 that define internal cavity 114. Internal cavity 114 in head 112 has a hexagonal shape in this configuration with two stops 116 on the inside of side walls 113. Handle 110 and head 112 are preferably made of plastic although other medical grade materials are also envisaged such as, e.g. stainless steel, titanium, etc.

Figure 2B:
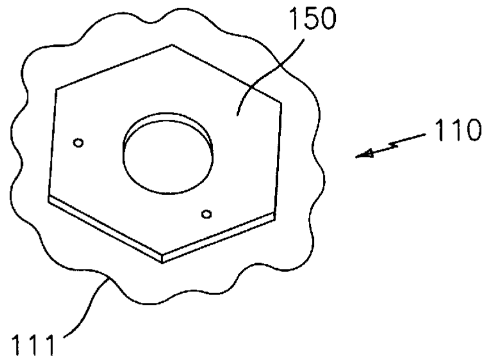
FIG. 2B is a perspective view of an alternative handle configuration for the torque apparatus.

In FIG. 2B an alternative configuration is shown which integrates handle 110 into cap 150. In this configuration, cap 150 contains a grip enhancing means 111, such as knurling, scalloping, or radially extending undulations, and would enable the user to apply sufficient torque in the lower ranges of torque values.

Figure 2C:
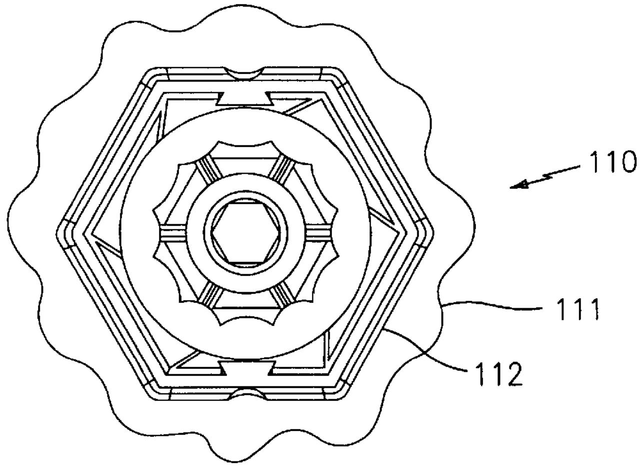
FIG. 2C is a view of an additional handle configuration for the torque apparatus.

In FIG. 2C an additional configuration is shown which integrates handle 110 into head 112. In this configuration, head 112 contains a grip enhancing means 111, such as knurling, scalloping, or radially extending undulations, and would similarly enable the user to apply sufficient torque in the lower ranges of torque values. This configuration of torque apparatus 100 could also be extended longitudinally to take the form of a screwdriver-torque wrench.

Figure 3A:
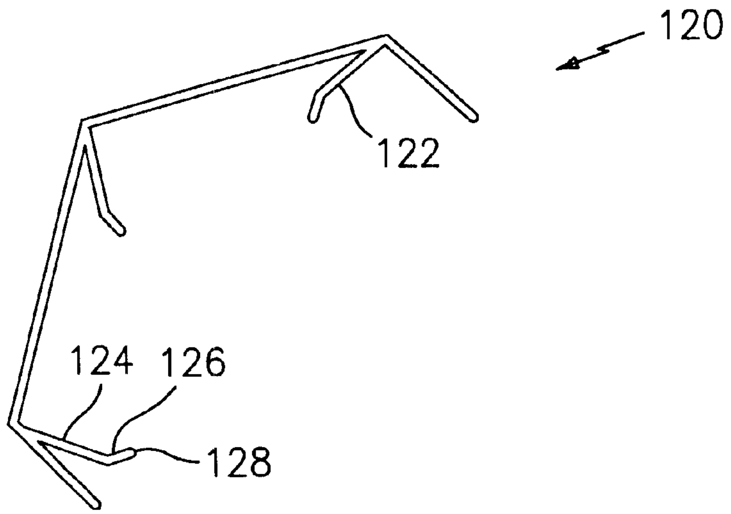
FIG. 3A is an enlarged top view of a leaf spring section.

Referring now to FIG. 3A, angular leaf spring 120 has a plurality of novel cantilevered beam elements 122 that are sharply angled from a radial azimuth and are positioned to provide the torque limiting component of the design. Each beam element 122 has a first section 124 and a second section 126, which is defined by a second bend in the beam element 122. Second bend section 126 facilitates sustaining the proper degree of physical interface at all times. Second section 126 has end with an inside end corner 128 that is coined with a radius profile that is designed to minimize frictional forces.

Figure 3B:
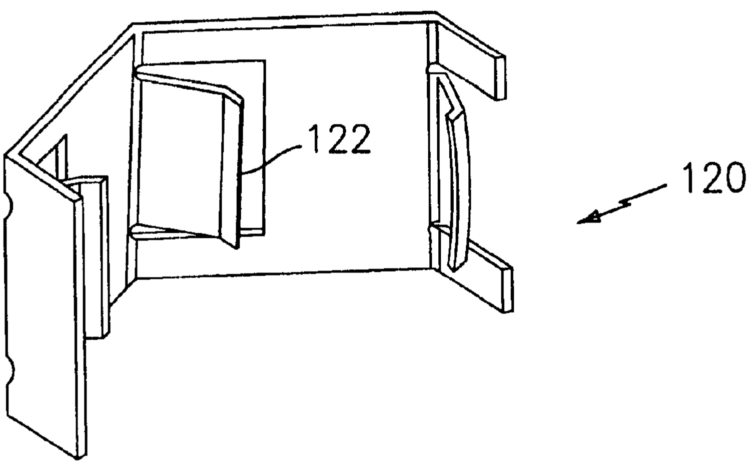
FIG. 3B is an enlarged perspective view of a leaf spring section.

In FIG. 3B, leaf spring 120 is shown with angled cantilevered beam elements 122. The number of leaf spring elements 122 per leaf spring 120 can vary with the design application. Leaf spring 120 is preferably made from a sheet metal stamping.

Figure 4A:
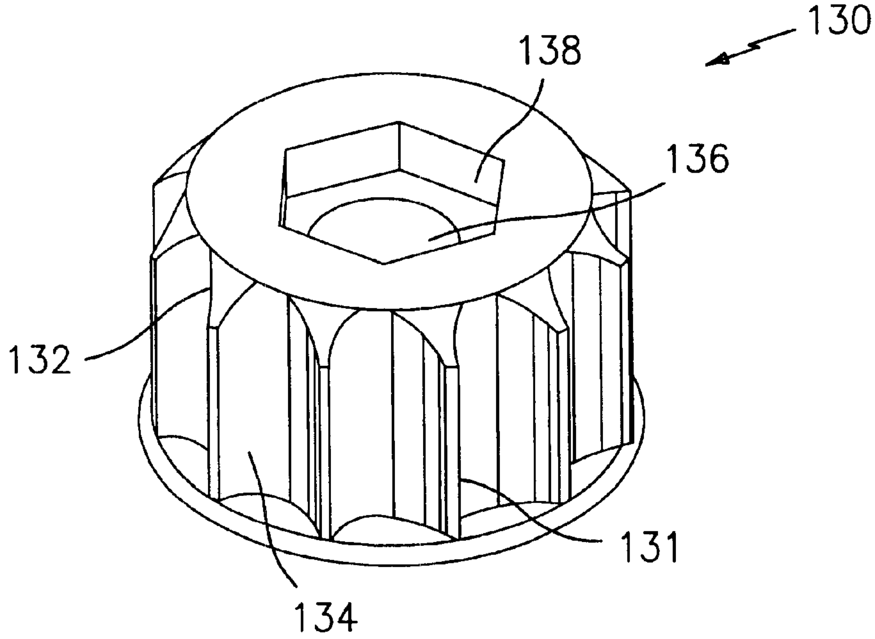
FIG. 4A is an enlarged perspective view of the rotor showing the radial drive teeth.

Referring now to FIG. 4A, the rotor 130 in this configuration has twelve simple radially extending single toothed drive teeth 131. The quantity of drive teeth 131 can vary with the design application. Each drive tooth 131 has a clockwise ramp side 132 and a counterclockwise flat side 134. The top of rotor 130 defines a hexagonal cavity 136 with sidewalls 138. Rotor 130 is preferably made of medical grade plastic materials.

Figure 4B:
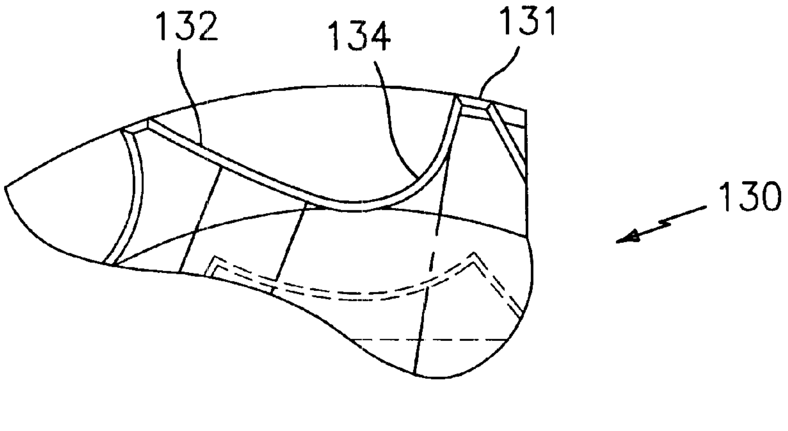
FIG. 4B is an enlarged sectional view of a portion of the rotor showing the asymmetrical sides of the drive teeth.

In FIG. 4B the asymmetrical nature of the sides of drive teeth 131 of rotor 130 is illustrated. In this configuration, clockwise ramp sides 132 are gradually sloped and counterclockwise flat sides 134 are steeply angled. Additional asymmetrical configurations of sides 132 and 134 can be used to vary the range of torque values of this mechanism. Similarly, the rotor 130 design can be reversed to have a flat side 134 in the clockwise direction and a ramp side 132 in the counterclockwise direction.

Figure 5:
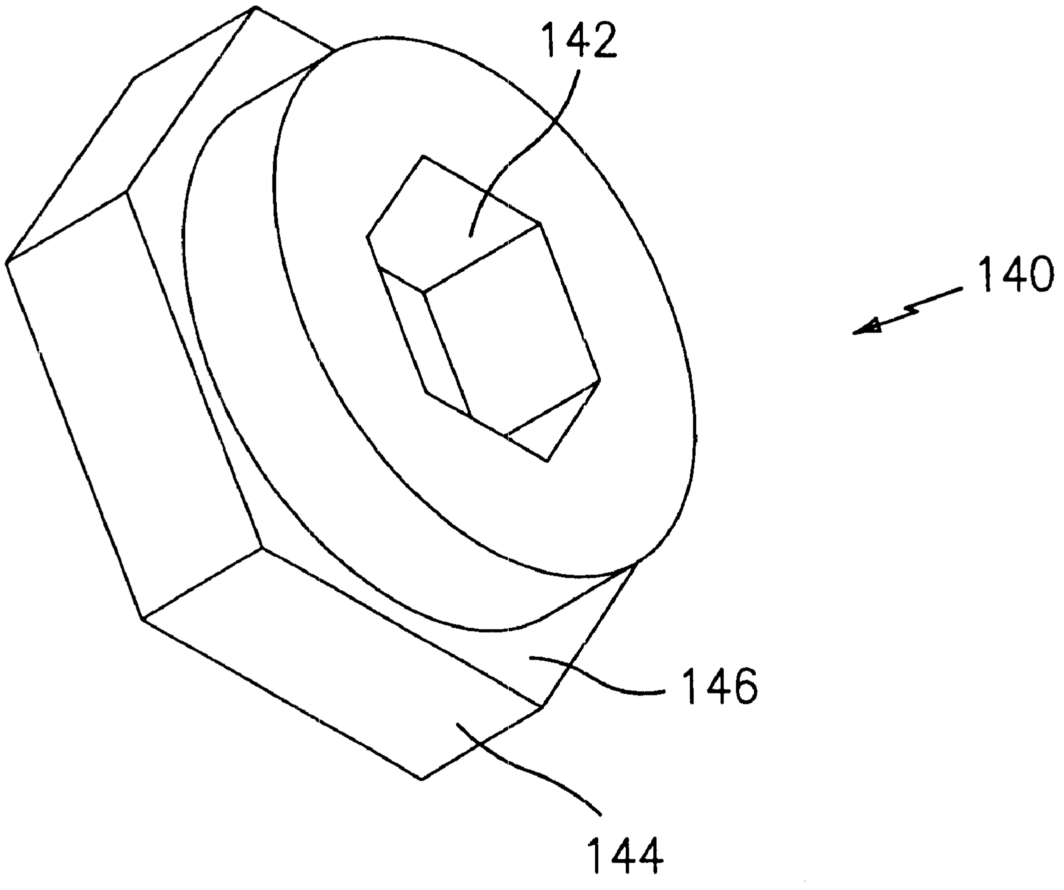
FIG. 5 is an enlarged perspective view of one configuration of a hex drive insert.

Referring now to FIG. 5, drive insert 140 functions as a drive mechanism interface for threaded connecting devices. In FIG. 5, a 9/32 inch hex drive insert 140 is shown that is specifically intended to interface with the CUSA EXcel 23 kHz product manufactured by Valleylab Inc. The drive insert 140 hex interface can also be configured for a 7/32 inch hex drive 140 to interface with CUSA EXcel 36 kHz handpieces manufactured by Valleylab Inc. Additional drive insert 140 configurations could include interfaces for other hexagonal sizes as well as hex key, slot or phillips head screw driver, or any similar working member or attachment type device. All the drive inserts 140, such as the 7/32 drive insert 140 and 9/32 insert have the same external hexagonal sidewall 144 dimensions and shoulder 146 and are thus interchangeable. Drive insert 140 is preferably made of metal, and in the removable cap configuration, is specifically designed to be easily changed in a sterile environment.

Figure 6:
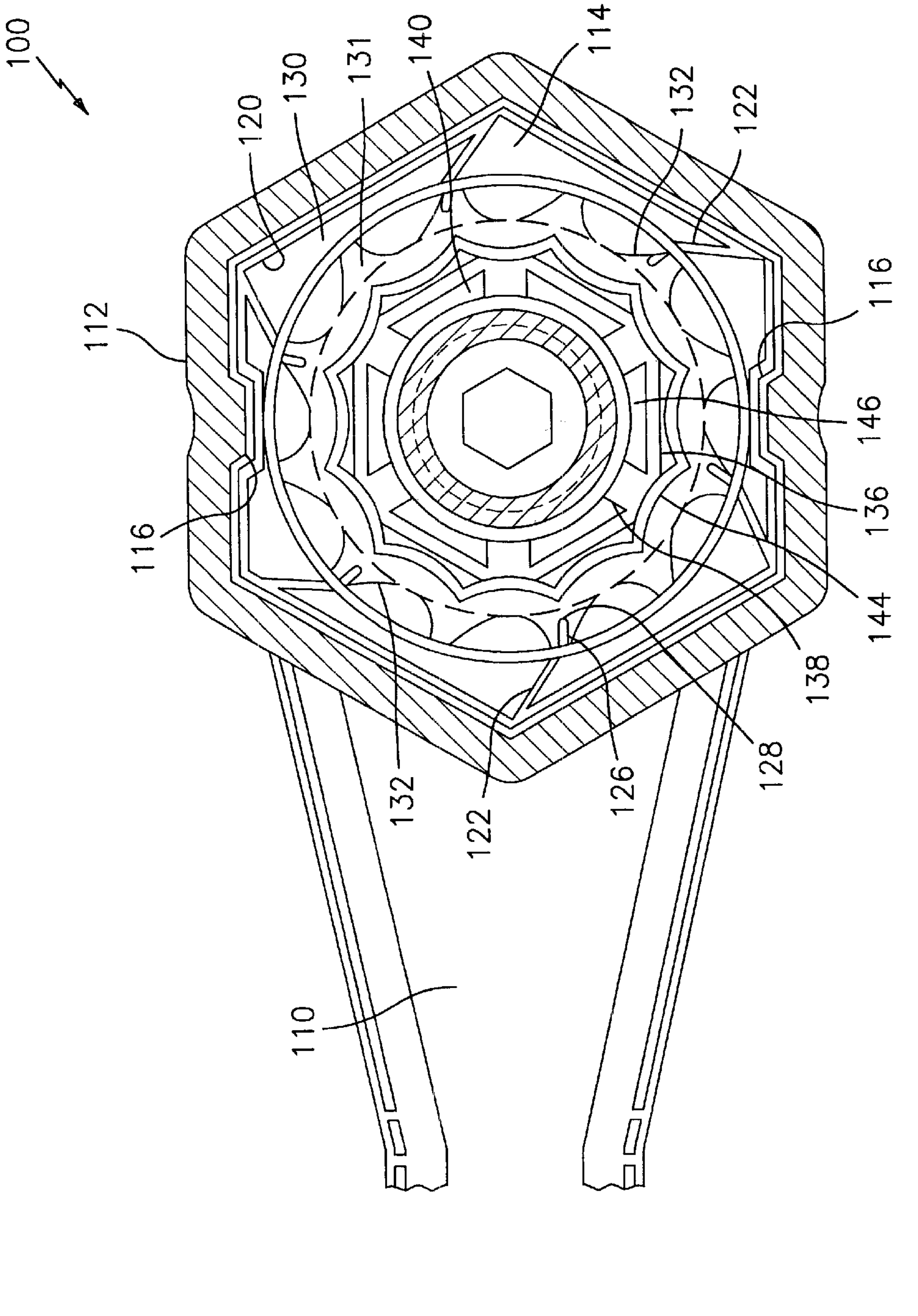
FIG. 6 is an enlarged top view of the head of a torque wrench with a pair of leaf springs, rotor, and drive insert installed showing the engagement between the leaf springs and the rotor drive teeth.

Referring now to FIG. 6, torque wrench 100 is shown partially assembled. In this illustration, two leaf springs 120 are installed in head 112 between two stops 116 in cavity 114. Torque wrench 100 can operate with one or more leaf springs 120 to establish a different set of torque vlaues at preset intervals. Torque values are preset in the hermetically sealed configuration and, in addition, torque wrench 100 can also be configured to be easily disassembled in so that leaf springs 120 may be easily added to or removed from head 112 in a sterile environment. Rotor 130 is positioned within head 112 to engage leaf spring elements 122. Hex drive insert 140 can be a separate assembly and installed within rotor 130 or be configured as an integral part of the rotor 130. As installed within rotor 130 as a separate assembly, the drive insert 140 is inserted into hexagonal cavity 136. Sidewalls 144 of rotor 140 then interface directly with the sidewalls 138 of hexagonal cavity 136. The materials in the combined configuration of rotor 130 and drive insert 140 can include medical grade plastic or metal for both subassemblies or combinations of different materials bonded together.

Drive insert 140 has a shoulder 146 which rides between the head 112 and the rotor 130. The drive insert 140 is designed to be removable and replaceable in a sterile environment and is retained inside rotor 130 without a press fit or glue.

In operation, when the operator turns the torque wrench 100 clockwise to tighten a working member, the bias of each leaf spring element 122 turns rotor drive teeth 131, drive insert 140, and thus the threaded connecting device with the user's applied torque until the torque limit is exceeded. In this process, ramp sides 132 engage a plurality of inside coined edges 128 of second sections 126 of beam elements 122. The coining of inside edge 128 creates an almost frictionless interface between the plastic rotor 130 and metal beam element 122. With friction reduced, the user then only needs to increase the applied torque to ramp side 132 to deflect and overcome the opposing counter force from the spring bias of the at least one angled leaf spring cantilever beam element 122. The opposing counter force from each cantilevered beam element 122 increases as it is deflected and applied clockwise torque approaches its maximum as the inside edge tip 128 of second section 126 is forced up ramp side 132. The applied torque peaks just prior to leaf spring element 122 releasing past ramp side 132. The slippage of each leaf spring element 122 up and over ramp side 132 of rotor drive teeth 131 defines a torque controlling mechanism that limits the applied torque to rotor drive teeth 131 and drive insert 140. With the installation of one leaf spring 120 in head 112, torque wrench 100 achieves approximately 30 in-lbs in the clockwise direction before releasing for the CUSA EXcel 36 kHz instrument and, using two leaf springs, at least about 60 in-lbs for the CUSA EXcel 23 kHz instrument before leasing.

When an operator removes a working member with a counterclockwise rotation, a plurality of flat sides 134 of rotor 130 form flush interfaces with a plurality of second beam sections 126 of cantilevered beam elements 122. At this point, beam elements 122 are placed primarily in compression and secondarily in a transverse deflection. The working member removal torque necessary for the flat side 134 to compress the second beam 126 in the counterclockwise direction is at least about 1.5 times that of the installation torque of the maximum torque achieved by ramp side 132 to second beam 126 interface just prior to releasing. When the maximum torque is exceeded, the torque controlling mechanism limits the applied torque to the rotor drive teeth 131 and drive insert 140 by forcing the release or slippage of leaf spring elements 122 past the flat side 134 of rotor drive teeth 131. Wrench 100 is configured to provide an audible click that also has a distinct tactile indiction in the wrench with the rotation of every drive tooth 131 or approximately every 30 degrees of rotation in this application. Rotor 130 is preferably made of a plastic type material that will minimize frictional forces between the metal beam element 122 and ramp side 132 and flat side 134 of drive teeth 131.

Torque wrench subassemblies such as the handle 110, head 112, leaf springs 120, rotor 130, drive insert 140, and cap 150 (see FIG. 1) may be combined to form a reduced total number of subassemblies. For example, rotor 130 and drive insert 140 may be combined into a single subassembly, cap 150 can include handle 110, and in a similar manner, one or more leaf springs 120 may be permanently installed into head 112.

Figure 7:
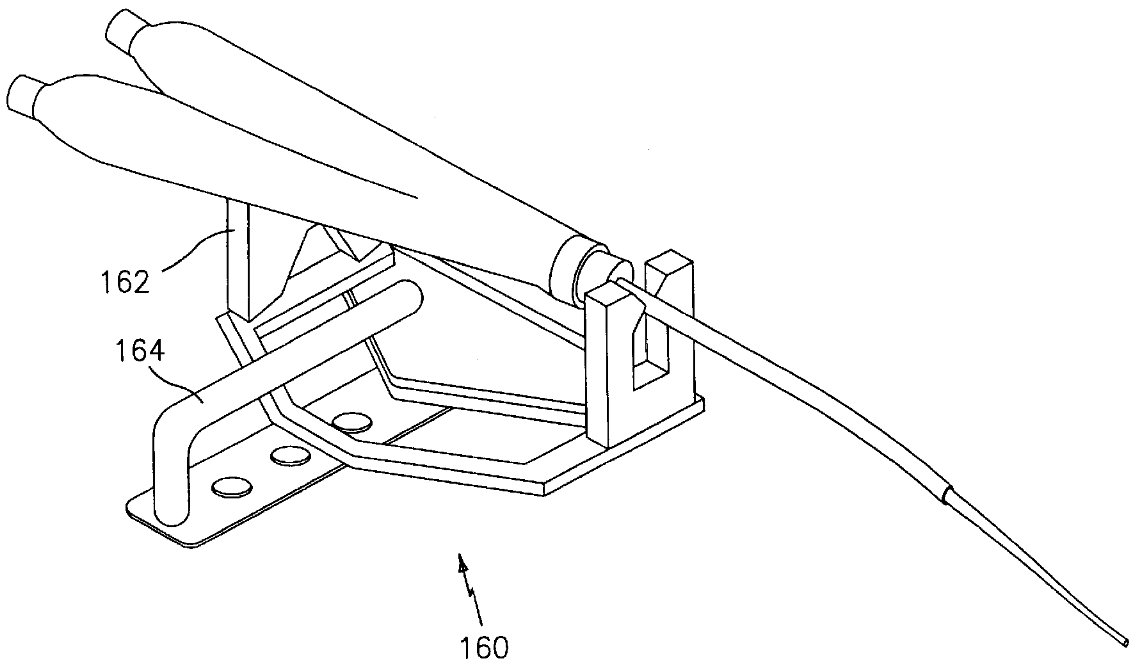
FIG. 7 is a perspective view of the holding device for applying a controlled amount of torque.

Referring now to FIG. 7, a holding device 160 is provided in this embodiment to hold CUSA EXcel product line 23 kHz and 36 kHz surgical instrument handpieces, but could be configured to hold any number of devices. The holding device 160 is intended to be reusable and is used in conjunction with the torque wrench while torquing working members or tips onto or removing them from CUSA handpieces. Holding device 160 has at least one pair of gripping devices 162 for holding the metal portion of the instrument's handpiece and supports the overall body of the instrument. This reduces the risk of damage to the more fragile plastic areas of the handpiece. In addition, holding device 160 provides the user with a hand hold 164 that provides a mechanical advantage during the torquing process. The design of holding device 160 provides a rapidly cooling geometry which expedites cooling upon removal from an autoclave.

Figure 8:
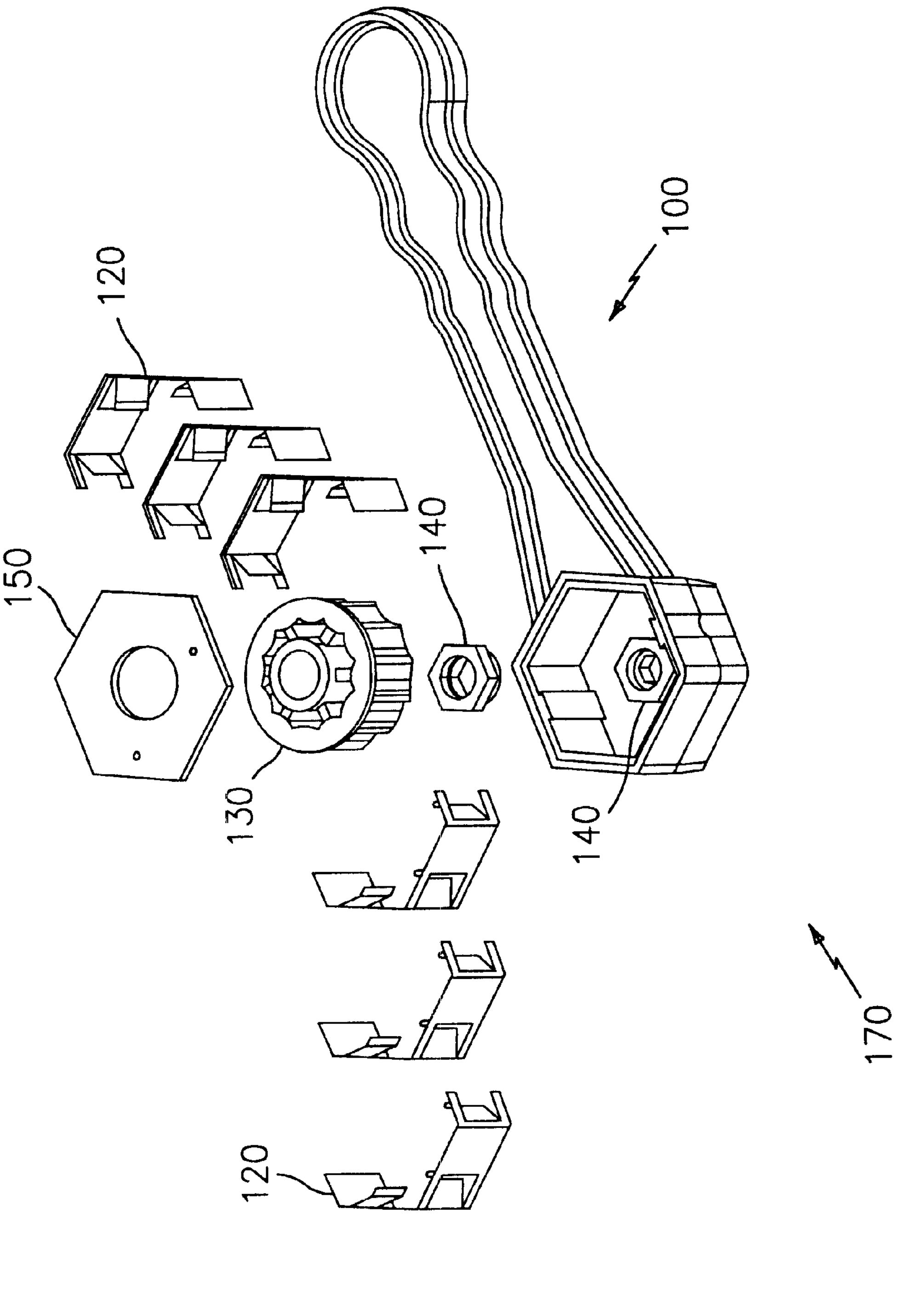
FIG. 8 is a perspective view of the torque apparatus kit which includes a apparatus, a plurality of leaf springs, one or more rotors, and numerous drive inserts for common connector interfaces.

Referring now to FIG. 8, a torque apparatus kit 170 which includes components such as one or more torque wrenches 100, a set of leaf springs 120, one or more rotors 130, and a set of drive inserts 140 that provide flexibility of use in applications such as hex wrench, hex key, screwdriver, etc., and a cap 150.

A set of leaf springs 120 provides a range of torque values. Using one configuration of the current torque wrench 100 that can employ up to two leaf springs, a first pair of leaf springs 120 is mounted in the kit with a given torque value next to a second pair of leaf springs 120 with a higher torque value. Each leaf spring 120 would be labeled with its torque limit values in both directions of rotation when used individually, its increased torque values when used in combination with its paired leaf spring 120, as well as its relative point of retention within the kit being labeled with its individual and paired torque values. In a similar manner, a set of drive inserts 140 provides torque wrench 100 with a range of inserts for application with different types of threaded connecting devices.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure.

We claim:

1. A torque apparatus comprising:

a head at one end thereof and a handle at the opposing end, said head defining a hexagonal cavity that contains at least one stop and is enclosed by a cap;

at least one leaf spring positioned in the head and retained by said at least one stop within the hexagonal cavity of the head, said leaf spring containing at least one leaf spring element having a first section and a second section, where the second section is bent with respect to the first section;

a rotor positioned within the hexagonal shaped cavity of the head, said rotor containing a plurality of radially extending drive teeth, said drive teeth having asymmetrical sides which define a ramp side in one direction and a flat side in the opposite direction, said rotor drive teeth sides engaging at least the second section of the at least one leaf spring element to produce a preset torque limit in at least one direction of rotation;

a drive insert positioned within the rotor, between the rotor and the head for engaging with threaded members, said drive insert and rotor being retained within the hexagonal cavity by the cap; and a torque controlling mechanism in at least one rotational direction defined by the engagement of at least one leaf spring element with one of the sides of the rotor drive teeth such that when the torque applied is increased, said at least one leaf spring element engages and slips past the sides of the rotor drive teeth, the engagement of said leaf spring element with said drive tooth defining a limit to the torque that can be applied before slipping.

2. The torque apparatus of claim 1, wherein the torque controlling mechanism in at least one direction is defined by the engagement of at least one leaf spring element with the ramp side of the rotor drive tooth such that when the torque applied is increased, the leaf spring element is predominantly deflected and slips past the rotor drive tooth when a predefined torque limit is exceeded between the rotor drive tooth ramp side and the leaf spring element.

3. The torque apparatus of claim 1, wherein the torque controlling mechanism in at least one direction is defined by the engagement of at least one leaf spring element with the flat side of the rotor drive tooth such that when the torque applied is increased, the leaf spring element is predominantly placed in compression and slips past the rotor drive tooth when a predefined torque limit is exceeded between the rotor drive tooth flat side and the leaf spring element.

4. The torque apparatus of claim 1, wherein the torque controlling mechanism limits the applied torque in one direction of rotation to at least 1.5 times that of the torque limit in the other direction of rotation.

5. The torque apparatus of claim 1, wherein the torque controlling mechanism produces an audible indication as said at least one leaf spring element slips past the rotor drive teeth when the torque limit is exceeded.

6. The torque apparatus of claim 1, wherein the torque controlling mechanism produces an tactile indication as said at least one leaf spring element slips past the rotor drive teeth when the torque limit is exceeded.

7. The torque apparatus of claim 1, wherein the torque controlling mechanism in at least one direction is defined by the engagement of at least one leaf spring element with one of the sides of the rotor drive teeth such that when the torque applied is increased, the leaf spring element is predominately placed in compression and the torque limit prevents the leaf spring from slipping past the rotor drive tooth.

8. The torque apparatus of claim 1, wherein the cap is fixedly connected to the head.

9. The torque apparatus of claim 1, wherein the cap encloses the head forming a hermetic seal.

10. The torque apparatus of claim 1, wherein the cap, the at least one leaf spring, the rotor and the drive insert are removably positionable on the head.

11. A torque apparatus for applying a controlled amount of torque on threaded connections comprising:

a handle;

a head that is connected to said handle, said head defining an internal cavity;

at least one leaf spring retained within the internal cavity, said leaf spring containing at least one leaf spring element having a first section and a second section, where the second section is bent with respect to the first section; and a rotor positioned within the cavity of the head that includes an integral drive insert, said rotor containing asymmetrical sides of its plurality of radially extending drive teeth, said drive teeth positioned to engage at least the second section of said at least one leaf spring element in at least one rotational direction to produce a preset torque limit in at least one direction of rotation, the preset torque limit defining the amount of torque applied to slip the at least one leaf spring element past the rotor drive teeth.

12. The torque apparatus of claim 11, wherein the drive insert provides a hexagonal interface.

13. The torque apparatus of claim 11, wherein the drive insert is a separate assembly that mates with a cavity in the rotor.

14. The torque apparatus of claim 11, wherein the drive insert is monolithically formed as part of the rotor.

15. The torque apparatus of claim 11, wherein the cavity defined in the head is hexagonal shaped.

16. The torque apparatus of claim 15, wherein the hexagonal cavity includes at least one stop that is configured to retain the at least one leaf spring.

17. The torque apparatus of claim 11, wherein a cap is removably positioned over the cavity in the head.

18. The torque apparatus of claim 17, wherein the cap includes a grip enhancing means.

19. The torque apparatus of claim 18, wherein the cap grip enhancing means includes scalloping or knurling type devices.

20. The torque apparatus of claim 11, wherein the asymmetrical sides of the rotor drive teeth includes a ramp side and a flat side.

21. The torque apparatus of claim 11, wherein a torque controlling mechanism is defined by the interface between the leaf spring element and the rotor drive tooth side such that when a torque limit is exceeded, the leaf spring element slips past the rotor drive tooth.

22. The torque apparatus of claim 21, wherein the torque controlling mechanism defines a different torque limit in a first rational direction than in a second rotational direction.

23. The torque apparatus of claim 11, wherein the handle and head are made of medical grade plastic.

24. The torque apparatus of claim 11, wherein the rotor is made of medical grade plastic.

25. The torque apparatus of claim 11, wherein the drive insert is made of metal.

26. The torque apparatus of claim 11, wherein the leaf spring is made of stamped metal.

27. The torque apparatus of claim 11, wherein the leaf spring element is angled from a radial direction.

28. The torque apparatus of claim 27, wherein the leaf spring element contains a first section and a second section, with said second section containing a second bend to ensure proper contact to the ramp.

29. The torque apparatus of claim 28, wherein the second bend of said leaf spring element includes an end with an inside end corner that is coined with a radius profile.

30. The torque apparatus of claim 11, wherein a plurality of leaf springs are positioned in the head providing a plurality of leaf spring elements that engage a plurality of rotor teeth sides.

31. The torque apparatus of claim 11, wherein the torque apparatus has a fixed torque limit in the clockwise and a different fixed torque limit in the counterclockwise direction and is primarily constructed of plastic.

32. The torque apparatus of claim 11, wherein the head includes a grip enhancing means.

33. The torque apparatus of claim 32, wherein the head grip enhancing means includes scalloping and knurling type devices.

34. The torque apparatus of claim 11, wherein the head includes a cap that is integrally attached and forms a hermetic seal over said cavity.

35. The torque apparatus of claim 11, further comprising a torque controlling mechanism for producing the preset torque limit, the preset torque limit generating an audible indication as said at least one leaf spring element slips past the rotor drive teeth when the torque limit is exceeded.

36. The torque apparatus of claim 11, further comprising a torque controlling mechanism for producing the preset torque limit, the preset torque limit generating a tactile indication as said at least one leaf spring element slips past the rotor drive teeth when the torque limit is exceeded.

* * * * *